United States Patent [19]

Murase

[11] Patent Number: 4,535,107

[45] Date of Patent: Aug. 13, 1985

[54] METHOD OF TREATING POLYESTER MATERIAL FOR RUBBER REINFORCEMENT

[76] Inventor: Shigemitsu Murase, 68-189 Terada Amatsuka, Joyo-Shi, Kyoto-Fu, Japan

[21] Appl. No.: 532,931

[22] Filed: Sep. 16, 1983

[30] Foreign Application Priority Data

Jan. 10, 1983 [JP] Japan ................... 58-2482

[51] Int. Cl.³ .................... C08K 5/42; C08K 5/15
[52] U.S. Cl. ..................... 524/157; 524/114; 523/461; 523/404; 523/453; 523/416; 525/510
[58] Field of Search .............. 523/416, 461, 404, 453; 525/510; 524/157, 114

[56] References Cited

U.S. PATENT DOCUMENTS

| | | | |
|---|---|---|---|
| 2,769,798 | 11/1956 | Meis et al. | 524/114 |
| 3,153,003 | 10/1964 | O'Brien | 524/114 |
| 3,456,035 | 7/1969 | Enders et al. | 525/510 |
| 3,525,703 | 8/1970 | Ichiro Iwami et al. | 523/461 |
| 3,567,668 | 3/1971 | Guldenpfennig | 523/416 |
| 3,690,926 | 9/1972 | Wampetich et al. | 524/114 |
| 3,705,124 | 12/1972 | Selby et al. | 524/157 |
| 3,816,235 | 6/1974 | Lin | 524/114 |
| 3,844,998 | 10/1974 | Jeffery et al. | 525/510 |
| 3,969,300 | 7/1976 | Nagata et al. | 525/510 |
| 4,151,131 | 4/1979 | Sekmakas et al. | 523/416 |
| 4,330,444 | 5/1982 | Pollman | 523/404 |
| 4,371,637 | 2/1983 | Topfl | 523/416 |

*Primary Examiner*—Paul R. Michl
*Assistant Examiner*—A. H. Walker

[57] ABSTRACT

This invention is a method of treating polyester material for use in reinforcing rubber, the method being characterized by treating the polyester material with a treating liquid containing an epoxy compound and a melamine compound and subsequently heat treating the material at 100°–250° C.

7 Claims, No Drawings

METHOD OF TREATING POLYESTER MATERIAL FOR RUBBER REINFORCEMENT

BACKGROUND OF THE INVENTION

This invention relates to a method of treating polyester material to improve its adhesion to rubber, particularly by using a treating composition which contains an epoxy compound and a melamine compound, followed by heat treatment of the polyester material at a temperature of 100°–250° C.

Polyester fibers have excellent tensile strength, dimensional stability, heat resistance and water resistance. It has many properties that make it desirable for use as a reinforcing material for rubber.

However, polyester fibers have a great shortcoming on that their adhesion to rubber is inferior to that of polyamide fibers such as nylon 6, nylon 66, which are also representative industrial fibers.

Thus, polyamide fibers achieve a very good adhesion to rubber simply by treating them with a resorcinol-formaldehyde-rubber latex (RFL) adhesive; in the case of polyester fibers, good adhesion is not achieved by this RFL treatment.

For this reason, numerous attempts have been made to improve the adhesion of polyester fibers to rubber. Typical methods are as follows: RFL treatment, i.e., the dip treatment of the fabric of the greige cord, is given after pretreatment with an adhesive such as an epoxy compound, an isocyanate compound, an ethylene urea compound; in the dip treatment, the RFL is mixed with an esterophilic component such as a novolak resin, 2, 6-bis (2', 4'-dihydroxyphenylmethyl)4-chlorophenol, known by the trade name of Pexul; and (2) an adhesive such as an epoxy compound or an isocyanate compound is applied at the yarn stage followed subsequently by the dip treatment with RFL. In the former method, the desired adhesion is achieved to a certain extent but the amount of adhesive used becomes large and the treating procedure becomes complicated, resulting in increased costs. The latter method has a practical advantage in that, like with polyamide fibers, only RFL treatment is necessary; but adhesion, which is the key requirement, is somewhat unsatisfactory. Consequently, in the latter method, a new problem is created that, in order to increase adhesion, the yarn treatment must be performed under impractical conditions, e.g., the concentration of the adhesive is markedly increased or heat treatment is made extremely severe.

SUMMARY OF THE INVENTION

With this background, this invention provides a method of treating polyester material for use in reinforcing rubber, by which a polyester material having good adhesion to rubber is obtained, by applying an adhesive to the polyester material and then carrying out the RFL treatment subsequently.

Thus, this invention is characterized by treating polyester material with a treating composition containing an epoxy compound and a melamine compound, and then heat-treating the polyester material at a temperature of 100°–250° C.

The epoxy compound which is used in this invention is usually synthesized by the reaction of an epoxy compound containing "halogen; for example, it can be synthesized by the reaction of epichlorohydrin" and an alcohol or phenol. Examples of such alcohol or phenol are: polyhydric alcohols such as glycerol, ethylene glycol, diethylene glycol, propylene glycol, sorbitol, polyethylene glycol, polypropylene glycol, trimethylol propane, or their derivatives; and polyhydric phenols such as resorcinol, catechol, hydroquinone or their derivatives. One can also use cyclohexane epoxide, diglycidyl ether, obtained by oxidizing the unsaturated bonds with peracetic acid.

In this invention, the melamine compound means the initial condensation product of a melamine resin and its intermediate (such as methylolated melamine). As the melamine resin, one can use melamine-formaldehyde resin, melamine resin acid colloid, melamine-urea-formaldehyde resin.

In this invention, the polyester material means the rubber-reinforcing material of polyester which consists of the polycondensation product of a compound having two ester-forming OH groups, as typified by ethylene glycol, and a compound having two ester-forming carboxyl groups, as typified by terephthalic acid; typical examples are fiber, filament, cord, fabric of polyethylene terephthalate. The polyester is not limited to homopolymers, and it can be a copolymer; the copolymer component can be a compound containing more than three ester-forming groups, within a range that will not hinder the fiber-forming properties.

In applying the treating liquid of this invention to the fiber material, the said treating liquid is mixed into the oil portion used in making the yarn and the treating method is very simple. The oil portion for use in making yarn which is referred to here comprises the following components: the lubricating agent which is a natural oil such as mineral oil or coconut oil or a synthetic oil such as an ester of higher fatty acid and higher alcohol or polyhydric alcohol; a surfactant in an amount sufficient to emulsify and disperse the lubricating agent and the epoxy compound and melamine compound of this invention; an antistatic agent, heat resistant agent, reaction accelerator (catalyst for hardening), colorant, as needed.

When used together with such oil portion for making yarn, a preferred combination of the components is: 3–50 weight percent of epoxy compound and melamine compound combined, 20–70 weight percent of the lubricating agent, 10–50 weight percent of emulsifier, and a suitable amount of other additives such that the total becomes 100 weight percent.

After said treatment, the fiber is heat-treated at 100°–250° C. for 0.05 to several seconds; the method of heat treatment may be, e.g., a heating plate, heating roller, slit heater, oven. This heat treatment process can utilize the heat which is put on the fiber in the drawing process or it can be carried out it another process.

When the treating liquid is applied to the material in the form of cord, the epoxy compound and melamine compound can be applied to the cord as an aqueous dispersion using a suitable dispersing agent such as the sodium salt of dioctylsulfosuccinate. The cord is then heat treated at 100°–150° C. for 0.5 to several seconds under tensioning or relaxing; thus, this can be carried out as a pretreatment of dipping.

Regardless of the method which is used, the polyester material which is obtained by this invention achieves good adhesion to rubber simply by carrying out the usual RFL treatment.

As to the polyester material of this invention, there are no restrictions on the molecular weight, denier, number of filaments, cross-sectional shape, physical properties of the yarn, microstructure, additives, polymer properties (such as the concentration of the end carboxyl group), needless to say.

DESCRIPTION OF THE PREFERRED EMBODIMENT

The invention is explained in further detail by use of the following examples of application.

In the examples, measurement of the intrinsic viscosity was made at 20° C. in a mixed solvent of phenol/tetrachloroethane (1/1 weight ratio).

In the preparation of the greige cord, 40 twists/10 cm was given by use of a ring yarn twisting machine; then, two strands (cords) were joined together and were given the same 40 twists/10 cm.

The dip treatment was carried out under the following conditions.

| A Solution | |
|---|---|
| resorcinol | 15 parts |
| formaldehyde | 20 parts |
| sodium hydroxide | 0.4 part |
| water | 290 parts |
| B Solution | |
| vinylpyridine-butadiene-styrene latex liquid (40%) | 240 parts |
| butadiene-styrene latex liquid (40%) | 80 parts |
| water | 347 parts |

The A solution was cured at 25° C. for 6 hours and the B solution was cured at 25° C. for 4 hours; after this, the two solutions were mixed and additionally cured at 25° C. for 12 hours.

| Dip conditions | |
|---|---|
| target amount of the dip applied (solid content) | 5% |
| Drying zone | 80° C. × 30 seconds |
| Curing zone (2 chambers) | 230° C. × 80 seconds × 2 times |

Method of vulcanization: In an H-test mold, the dipped cord was embedded in unvulcanized rubber which had the following composition: 30 parts of smoked sheet; 70 parts of styrene-butadiene rubber; 40 parts of carbon black; 5 parts of zinc oxide; 1.5 parts of stearic acid; 1 part of phenyl-$\beta$-naphthylamine; 0.3 part of phthalic anhydride; 0.8 part of vulcanization accelerator; 0.15 part of diphenylguanidine; 2 parts of sulfur. Vulcanization was carried out under pressure at 140° C. for 40 minutes to effect the adhesion treatment.

Measurement of the adhesive force was carried out by the H-test method, i.e., the method in which measurement is made of the load needed for pulling out a cord from a depth of 1 cm in the rubber.

EXAMPLE OF APPLICATION, 1

Polyethylene terephthalate (PET) of intrinsic viscosity 0.95, obtained by a conventional method from the raw materials of terephthalic acid and ethylene glycol, was spun by use of an extruder-type melt spinning machine under the conditions of: melt temperature 290° C., throughput 450 g/min, and take-up speed 450 m/min. The five types of spinning oil portions listed in Table 1 were applied prior to take-up such that the amount of effective components applied would be 0.9 weight percent.

Next, drawing and heat treatment were carried out under conditions of: a first roller (100° C.), a second roller (100° C.), heating plate (240° C.), a third roller (230° C.), take-up roller, total draw ratio 6.0, take-up speed 200 m/min. Through this multi-stage drawing system, a PET yarn of 1500 denier, 192 filaments was obtained.

The PET yarn obtained was treated by the above described method and the adhesive property of the treated cord in rubber was measured. The results shown in Table 2 were obtained.

As is clear from Table 2, No. 3-5 which satisfy the conditions of this invention indicate higher adhesive properties than the Comparative Examples No. 1, 2.

TABLE 1

| Component | No. 1 | 2 | 3 | 4 | 5 |
|---|---|---|---|---|---|
| Oleyl oleate | 45 | 45 | 45 | | |
| Rapeseed oil | | | | 40 | 40 |
| POE (20) Castor oil | 15 | 20 | 20 | 15 | 20 |
| PEG (600) monooleate | | | 5 | 5 | 5 |
| POE (15) laurylphenol | 5 | 5 | | | |
| Epicote 812 | 30 | | 25 | 25 | 30 |
| Melamine resin | | 25 | 5 | 10 | 5 |
| m-phenylenediamine | 0.3 | | | 0.3 | |
| Dioctylsulfo-succinate-Na salt | 4.7 | 5 | | 4.7 | |
| Total | | | 100 | | |

Notes
1 Amount of each component of the oil portion is given in weight percent. (Applied as 20 percent aqueous emulsion).
2 POE means polyoxyethylene. Number in parenthesis indicates the number of moles added.
3 PEG means polyethylene glycol. Number in parenthesis means the molecular weight.
4 Epicote 812 is a trade name used by Shell Chemicals Co. for the epoxy compound whose main component is glycerine diglycidyl ether.
5 Melamine resin is the melamine-formaldehyde resin Smitex Resin M-3 (made by Sumitomo Chemical Company).

Notes 1. Amount of each component of the oil portion is given in weight percent. (Applied as 20 percent aqueous emulsion). 2. POE means polyoxyethylene. Number in parenthesis indicates the number of moles added. 3. PEG means polyethylene glycol. Number in parenthesis means the molecular weight. 4. Epicote 812 is a trade name used by Shell Chemicals Co. for the epoxy compound whose main component is glycerine diglycidyl ether. 5. Melamine resin is the melamine-formaldehyde resin Smitex Resin M-3 (made by Sumitomo Chemical Company).

TABLE 2

| No. | Adhesive Force (kg/cm) | Remarks |
|---|---|---|
| 1 | 13.5 | comparative example |
| 2 | 8.7 | comparative example |
| 3 | 17.2 | example of this invention |
| 4 | 17.3 | example of this invention |
| 5 | 17.6 | example of this invention |

EXAMPLE OF APPLICATION, 2

PET chips of intrinsic viscosity 0.90 were spun by use of an extruder-type melt spinning machine. Roller oiling method was used to apply 0.2 percent, based on the fiber weight, of the non-aqueous oil portion which consisted of the following components: low viscosity mineral oil 40 weight percent, isostearyl oleate 20 weight percent, glycerine dilaurate 10 weight percent, POE(6)

cetyl alcohol 20 weight percent, POE(10) stearyl amine 5 weight percent, sodium salt of dioctylsulfosuccinate 5 weight percent. After this application, the yarn was not wound up but was led to multistage drawing apparatus consisting of the heating rollers and separator rollers combined. After drawing, immediately before taking up with the winder, the No. 1 oil portion, No. 3 oil portion of Example 1 were applied by 0.7 weight percent, respectively, to obtain the PET yarns No. 6, No. 7 of 1500 denier, 192 filaments. In this case, the actual amount of oil portion which was applied in the previous stage was 0.1 weight percent and the total amount of application was 0.8 weight percent.

The adhesive force of the two types of PET yarns obtained were: 11.0 kg/cm for No. 6 (comparative example) and 16.0 kg/cm for No. 7 (example of this invention).

We claim:

1. An aqueous composition for application to polyester cord comprising a salt of dioctylsulfosuccinate, an epoxy compound and a melamine compound.

2. The composition of claim 1 wherein the salt of dioctylsulfosuccinate is the sodium salt.

3. The composition of claim 1 wherein the epoxy compound is synthesized by the reaction of an epoxy compound containing a halogen with an alcohol or phenol.

4. The composition of claim 3 wherein the epoxy compound containing a halogen is epichlorohydrin.

5. The composition of claim 1 wherein the epoxy compound is selected from the group consisting of compounds having double bond oxidized with peracetic acid, the reaction product of epichlorohydrin with an alcohol, and the reaction product of epichlorohydrin with a phenol.

6. The composition of claim 1 wherein the melamine compound is the initial condensation product of a melamine resin and its intermediate.

7. The composition of claim 6 wherein the melamine resin is selected from the group consisting of melamine-formaldehyde resin, melamine resin acid colloid, and melamine-urea-formaldehyde resin.

* * * * *